United States Patent
Prager et al.

(10) Patent No.: US 7,310,341 B2
(45) Date of Patent: Dec. 18, 2007

(54) SYSTEM AND METHOD FOR PARALLEL CONNECTION SELECTION IN A COMMUNICATION NETWORK

(75) Inventors: Walter Prager, Kanata (CA); David Ker, Brossard (CA); Carl Rajsic, Nepean (CA); Shawn McAllister, Manotick (CA)

(73) Assignee: Alcatel Canada Inc., Kanata (CA)

( * ) Notice: Subject to any disclaimer, the term of this patent is extended or adjusted under 35 U.S.C. 154(b) by 1039 days.

(21) Appl. No.: 10/302,922

(22) Filed: Nov. 25, 2002

(65) Prior Publication Data

US 2003/0156583 A1 Aug. 21, 2003

(30) Foreign Application Priority Data

Feb. 13, 2002 (CA) .................................... 2371654

(51) Int. Cl.
*H04L 12/50* (2006.01)
(52) U.S. Cl. ..................... 370/395.5; 370/352; 370/466
(58) Field of Classification Search ................ 370/233, 370/234, 238.1, 395.43
See application file for complete search history.

(56) References Cited

U.S. PATENT DOCUMENTS

| | | | | |
|---|---|---|---|---|
| 5,251,209 A | * | 10/1993 | Jurkevich et al. ........... 370/468 |
| 5,287,347 A | * | 2/1994 | Spanke ....................... 370/235 |
| 5,687,167 A | * | 11/1997 | Bertin et al. ................. 370/254 |
| 5,920,544 A | | 7/1999 | Watanabe |
| 5,930,253 A | * | 7/1999 | Brueckheimer et al. ....................... 370/395.61 |
| 5,978,356 A | * | 11/1999 | Elwalid et al. ............. 370/230 |
| 6,212,169 B1 | * | 4/2001 | Bawa et al. ................ 370/252 |
| 6,470,029 B1 | * | 10/2002 | Shimizu ...................... 370/468 |
| 6,657,964 B1 | * | 12/2003 | Kohzuki et al. ........ 370/236.1 |
| 6,760,305 B1 | * | 7/2004 | Pasternak et al. ........... 370/230 |
| 6,956,821 B2 | * | 10/2005 | Szviatovszki et al. ...... 370/237 |
| 7,079,534 B1 | * | 7/2006 | Medhat et al. .............. 370/389 |

FOREIGN PATENT DOCUMENTS

| | | |
|---|---|---|
| EP | 0 961 519 | 12/1999 |
| EP | 1 135 000 | 3/2000 |
| WO | WO 99/56432 | 11/1999 |
| WO | WO 02/09307 | 1/2002 |

* cited by examiner

*Primary Examiner*—Chi Pham
*Assistant Examiner*—Kevin Mew
(74) *Attorney, Agent, or Firm*—McCarthy Tetrault LLP

(57) ABSTRACT

The invention provides a system and method of a selecting an egress connection from egress connections at a node for a call being established in a network along a path being associated with the node. Each connection has sufficient bandwidth to carry the call and terminates at a same destination point in said path. The system and method comprise utilizing at least a bandwidth load balance value for each connection in a set of the connections to select the egress connection from the set. An administrative factor score may be used to further define members of the set.

16 Claims, 4 Drawing Sheets

SYSTEM AND METHOD FOR PARALLEL CONNECTION SELECTION IN A COMMUNICATION NETWORK

FIELD OF THE INVENTION

The invention relates generally to a system and method for selecting a communication connection from a plurality of communication connections connecting a node to another node in a communication network. In particular, the invention relates to a system and method for selecting a trunk group from a number of trunk groups for a node when a connection, such as a Switched Virtual Connection (SVC), is being established.

BACKGROUND OF INVENTION

In a communication network where a series of nodes are interconnected via various communication links, calls are established in the network by routing a connection through the network from an ingress node to an egress node. The calls may be established by an operator at a network management terminal connected to the network.

In an ATM network, several types of calls may be established, with each call having distinctive characteristics. A permanent virtual circuit (PVC) establishes a permanent connection from an ingress node to an egress node. At each node in the connection, a permanent bearer channel cross-connection is established by the network management terminal, which decides the route and manually configures each cross-connection at each node in the connection. Meanwhile, a soft permanent virtual circuit (SPVC) comprises a series bearer channel paths that are interconnected through "switched" (i.e. on-demand) bearer channel cross-connections made across a series of nodes. Specifically, the ingress and egress nodes are typically provisioned at the network management terminal by a network operator, but the cross-connects for a node are commissioned via signalling through the network. Accordingly, a SPVC is signalled and routed across the network from the ingress node to the egress node. Next, a switched virtual connection (SVC) is a path that is signalled from a user at the ingress node of the network to a user at the egress node. The route of the SVC path is determined by the nodes as the path is signalled from the source node towards the destination node in the network. The individual cross-connects for the SVC path are configured and connected by call control software operating on each node along the path as the connection routes itself through the network. Routing tables for connected nodes resident on each node allow the call to be established by hop-by-hop routing. Alternatively, a predetermined route may be specified in the connection request to provide source-routing. It will be appreciated that the term "bearer channel" is synonymous with a communication channel.

For an ATM call, an ATM service category defines traffic contract parameters and quality of service (QoS) characteristics for the call, thereby enabling different calls to have different levels of priority and performance. QoS parameters include the cell loss ratio (CLR) and the cell delay variation (CDV) for a call. Defined service categories, known in the art, are:

Constant Bit Rate (CBR), which is suitable for real-time data transmission, e.g. video, requiring a fixed amount of bandwidth provided at regular intervals;

Real-time Variable Bit Rate (rt-VBR), which is suitable for for time-sensitive data traffic requiring a low CLR;

Non-real-time Variable Bit Rate (nrt-VBR), which is useful for data traffic having no constraints on CDV but having a variable transmission rate between the standard rate and the peak rate;

Available Bit Rate (ABR), which is useful for calls which require a low CLR but may tolerate a high CDV. Typically, minimal network resources are made available to an ABR connection. Calls in the ABR category are typically fulfilled by the network on a "best-effort" basis when higher priority calls do not supercede the ABR call; and Unspecified Bit Rate (UBR), which is useful for calls which do not need low CLR nor CDV. As with ABR calls, UBR calls are typically serviced on a "best effort" basis.

In an ATM network, nodes are connected to each other through a series of physical communication links. As calls are routed through the network, a virtual path (VP) for the call is established through the nodes and their associated communication links. Within the virtual path, a series of virtual circuits (VCs) are typically provided, thereby ensuring that a given VP may be associated with several VCs, i.e. SVC, PVC and SPVCs. At each node, each VP/VC set is identified by a VPI/VCI address identifier.

Between a source node and a destination node, several connection types (SVC, PVC, SPVC etc.) may exist. The connection types are asssociated with particular ports on the source and destination nodes. Ports may be partitioned into sections, referred to as trunk groups. Accordingly, a trunk group may have several partitions each of which define a separate service category and connection type.

When a connection is routed from the source node to the destination node, a trunk group must be selected to carry the data traffic of the connection. In the prior art, when a SVC or a SPVC is being routed from a source node to a destination node, at the source node, the trunk group having a partition which meets the call requirements would be selected. When two or more trunk groups meet the call requirements, prior art solutions have implemented the following systems to distribute traffic amongst the trunk groups and or the partition:

(a) a round-robin algorithm;
(b) a randomizing algorithm;
(c) an algorithm utilizing the administrative weight (cost) of each group;
(d) an algorithm utilizing the current available bandwidth; and
(e) an algorithm utilizing the maximum available bandwidth.

However, these algorithms do not consider the bandwidth allocation of each trunk group based on utilization. Consequently, a trunk group with higher utilization than its peer trunk groups may become unnecessarily overloaded, which may lead to undesirable congestion and cell loss.

Thus, there is a need for a system and method for selecting a trunk group amongst communication links which considers utilization in the prior art system to attempt to reduce overload.

SUMMARY OF INVENTION

In an aspect of the invention, a method of a selecting one egress connection from egress connections at a node for a call being established in a network along a path being associated with the node is provided. Therein, each connection has sufficient bandwidth to carry the call and terminates at a same destination point in the path. The method involves utilizing at least a bandwidth load balance value for connections in a set of the connections to select the egress connection from the set. The set may comprise all connections, but not necessarily.

In the method, for each connection, the bandwidth load balance value may be expressed a ratio of a numerator and a denominator. The numerator has an expression of either the bandwidth used on each connection or bandwidth available on each connection. The denominator has an expression of either the bandwidth configured for each connection or bandwidth configured for all the connections.

In the method, connections in the set may be ranked utilizing an administrative factor score for each connection. Thereafter, the ranking and the bandwidth load balance value may be utilized to select the egress connection. All of the connections may also be ranked.

In the method, the administrative factor score may be a cost value for each connection.

In the method, the call may follow a transmission protocol such as ATM, MPLS or IP.

In the method, the call may have one of the following service requirements: constant bit rate (CBR), real-time variable bit rate (rt-VBR), non-real-time variable bit rate (nrt-VBR), available bit rate (ABR) and undefined bit rate (UBR) services.

In the method, the call may have a guaranteed bandwidth associated with it.

In the method, the call may have no minimum bandwidth guarantee. Further, for each connection, the bandwidth load balance value may be expressed as a ratio of: a number of calls associated with each connection to a number of either a bandwidth configured for each connection or a number of calls having no minimum bandwidth guarantee.

In the method, each connection may comprise a trunk group.

In the method, the balanced load value may be calculated prior to utilizing the administrative score factor for members of the set.

In a second aspect, a system for selecting a connection from egress connections is provided. The connections exist at a node in a network for a call being established in the network along a path being associated with the node. Each connection has sufficient bandwidth to carry the call. The system comprises a connection selection module which selects one connection from a set of connections to carry the call. The module determines a bandwidth load balance value for each connection in the set and selects one connection by comparing bandwidth load balance values of connections in the set of connections.

If the call has a guaranteed bandwidth, the connection selection module may determine the bandwidth load balance value by utilizing a ratio comprising a numerator and a denominator. The numerator may represent either the bandwidth used on each connection or the bandwidth available on each connection. The denominator may represent either the bandwidth configured for each connection or the bandwidth configured for all the connections.

In the system, if the call does not have a guaranteed bandwidth, the connection selection module may determine the bandwidth load balance value by utilizing another ratio. The numerator of the ratio may represent the number of calls for each connection node having no guaranteed bandwidth. The denominator of the ratio may represent either a bandwidth configured for each connection or the number of calls having no guaranteed bandwidth for the node.

In the system, the connection selection module may generate a ranking of the connections utilizing an administrative factor score for each connection. Prior to utilizing the bandwidth load balance value, populates the set with egress connections of the plurality of egress connections utilizing the ranking.

In the system, the call may follow either a ATM, MPLS or IP transmission protocol.

In a third aspect, a method of selecting a trunk group for routing a call in a connection-based network is provided. The method comprises the steps of:
  (a) identifying a set of trunk groups that are capable of meeting requirements of the call, where each trunk group of the set having a same destination node;
  (b) accessing a previously determined administrative factor for each trunk group in the set;
  (c) if only one trunk group in the set has the lowest administrative factor, selecting that trunk group for routing the call; and
  (d) if multiple trunk groups in the set have the lowest administrative factor, calculating a bandwidth parameter for each trunk group and selecting a particular trunk group for routing the call by utilizing the bandwidth parameter.

If the call has a guaranteed bandwidth, the method may have step d) calculating, for each trunk group providing the guaranteed bandwidth, the bandwidth parameter as a ratio of available bandwidth of each trunk group to maximum bandwidth configured for each trunk group and then selecting, as the particular trunk group, a trunk group with the lowest bandwidth parameter.

If the call does not have a guaranteed bandwidth, the method may have step d) calculating, for each trunk group supporting the call, the bandwidth parameter as a ratio of a number of unspecified bandwidth services calls carried by each trunk group to a maximum bandwidth configured for each trunk group, and then selecting, as the particular trunk group, a trunk group with the lowest bandwidth parameter.

In other aspects of the invention, various combinations and subsets of the above aspects are provided.

BRIEF DESCRIPTION OF THE DRAWINGS

The foregoing and other aspects of the invention will become more apparent from the following description of specific embodiments thereof and the accompanying drawings which illustrate, by way of example only, the principles of the invention. In the drawings, where like elements feature like reference numerals (and wherein individual elements bear unique alphabetical suffixes).

DETAILED DESCRIPTION OF THE EMBODIMENTS

Figure 1:
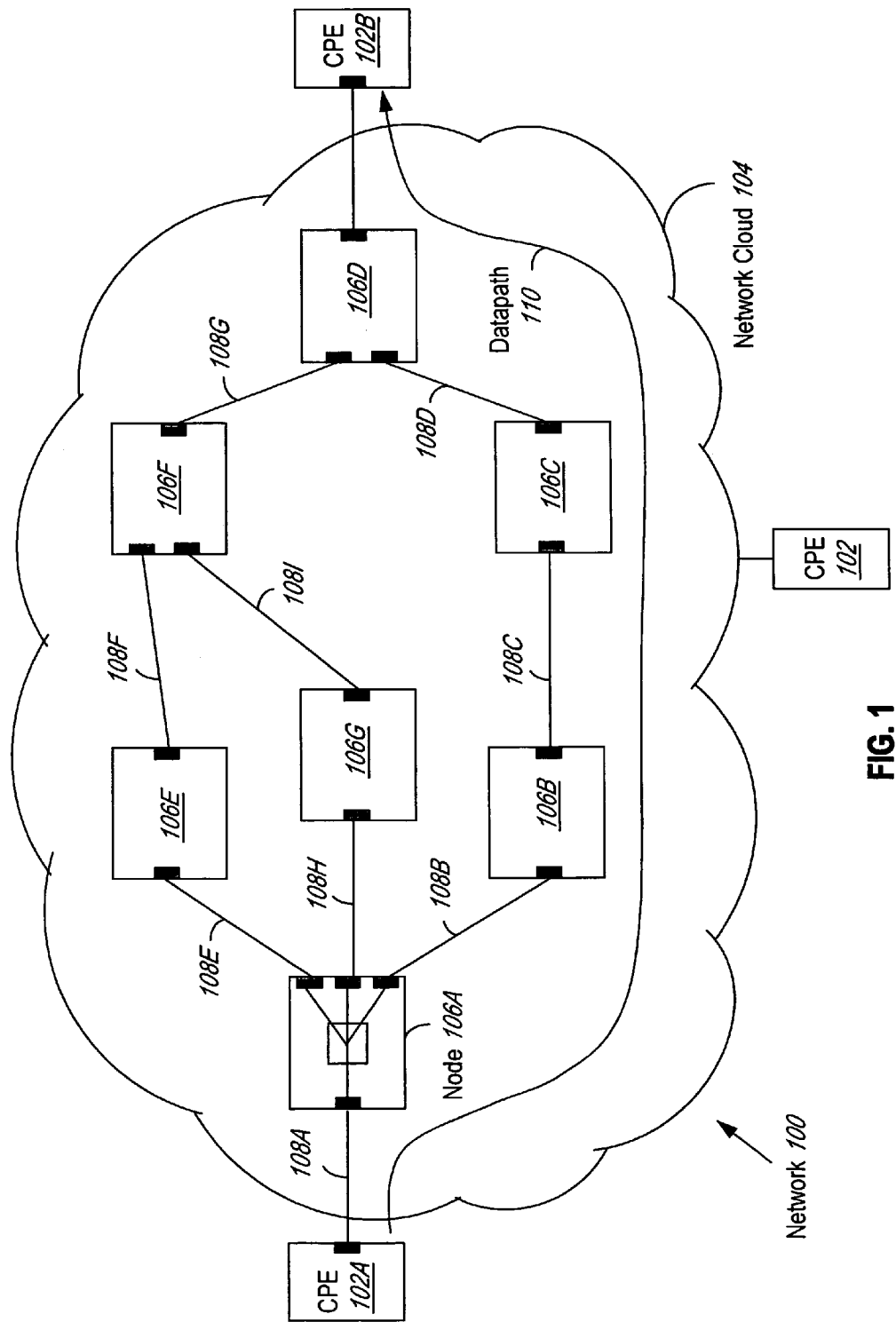
FIG. 1 is a block diagram of a communication network having a node connected to another node with a communication link, the node embodying the invention.

The description which follows, and the embodiments described therein, are provided by way of illustration of an example, or examples, of particular embodiments of the principles of the present invention. These examples are provided for the purposes of explanation, and not limitation, of those principles and of the invention. In the description, which follows, like parts are marked throughout the specification and the drawings with the same respective reference numerals.

The following is a description of a network element in a network associated with an embodiment. Referring to FIG. 1, a communication network 100 is shown. Network 100 enables data traffic to be communicated between customer premises equipment (CPE) 102A and a CPE 102B through network cloud 104. Network 100 also enables data traffic to be communicated to other CPEs 102 through network cloud 104.

Network cloud 104 comprises a plurality of nodes 106. Each node 106 is a communication switch which receives data traffic from another node 106 or CPE 102 and selectively transmits the data traffic to another node 106 or CPE 102. In the embodiment, nodes 106 utilize ATM protocols to govern data traffic flow. In other embodiments, other nodes may utilize other protocols, such as, for example, Multiprotocol Label Switching (MPLS) or IP.

Data traffic is carried between nodes 106 and CPEs 102 via individual communication links 108. Communication links 108 may comprise standard physical interfaces such as OC-3, OC-12 or DS3. As shown, CPE 102 is connected to node 106A via communication link 108A.

When CPE 102A transmits data traffic to CPE 102B through network cloud 104, a data path must be established in network cloud 104 to link CPE 102A to CPE 102B through selected nodes 106 to carry the data traffic. As shown, a data path 110 may comprise the path traversing nodes 106A, 106B, 106C and 106D. It will be appreciated that a data path is a logical connection and may be referred to as a routing path, connection, or a circuit. Accordingly, a data path 110 is a logical connection through nodes 106 which is carried over a physical link, namely communication link 108.

In establishing and maintaining a data path 110, a node 106 needs to communicate status information to other nodes 106. In the embodiment, a node 106 communicates with another node 106 using the Private Network-to-Network Interface (P-NNI) protocol which is described in the reference "Private Network-Network Interface Specification Version 1.0 (P-NNI 1.0)", doc. no. af-p-nni-0055.00, March 1996, published by the ATM Forum, and which is incorporated herein by reference in its entirety.

Figure 2A:
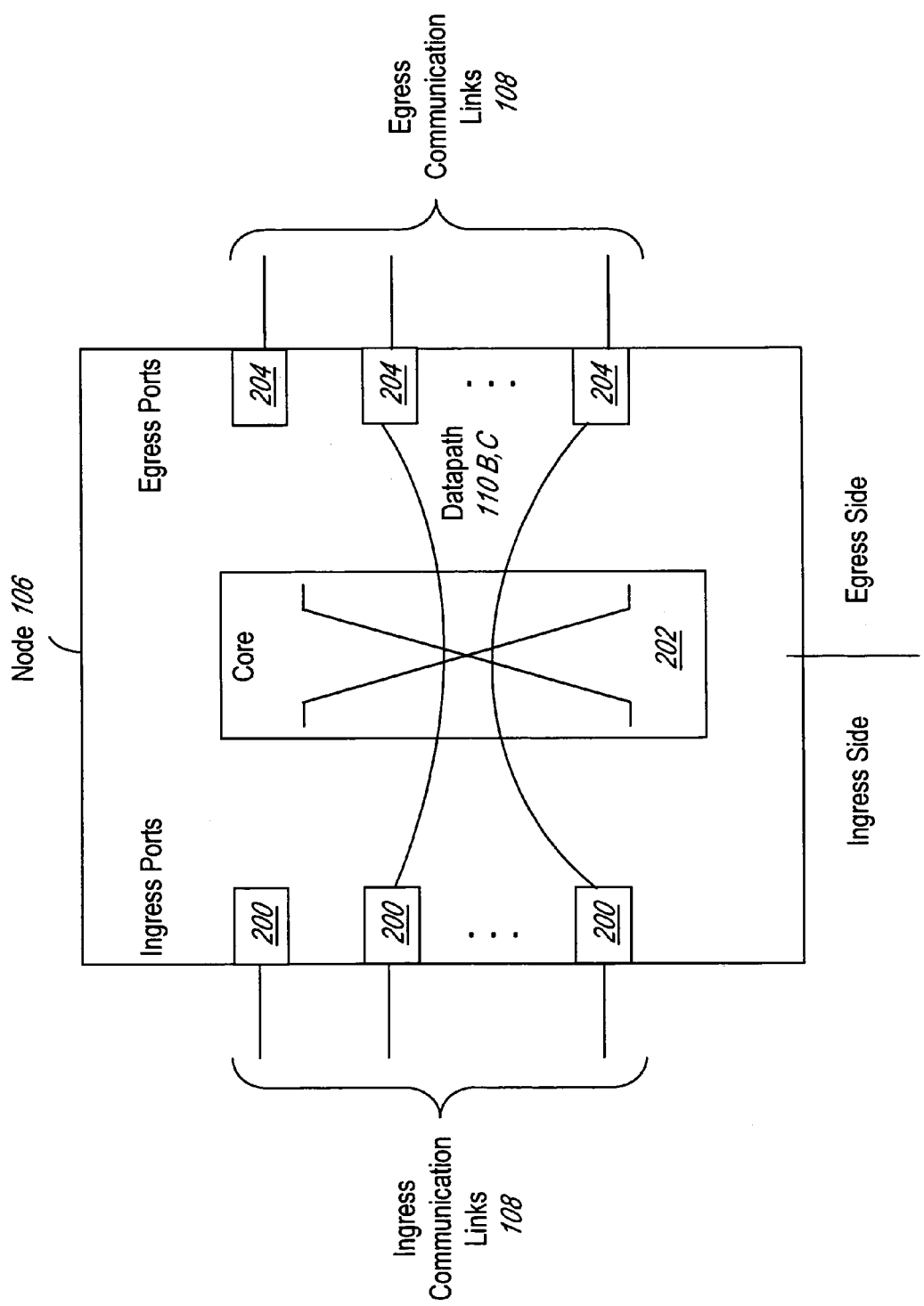
FIG. 2A is a diagram of ingress ports, a switching core and egress ports connected to a communication link of the node of FIG. 1.

Further detail on aspects of the node 106 are now provided. Referring to FIG. 2A, features of a given node 106 in network 100 are shown. Node 106 is connected to ingress communication links 108, which are each connected to separate ingress ports 200. The data traffic received from the ingress communication links 108 are processed by node 106 and are routed to be switched through the switching fabric 202 towards a selected egress port 204. At an egress port 204, an egress communication link 108 is connected thereto to enable transmission of the data traffic to the node connected to the egress communication link 204. As shown, data paths 110B and 110C may be provided between ingress ports 200 and egress ports 204.

Figure 2B:
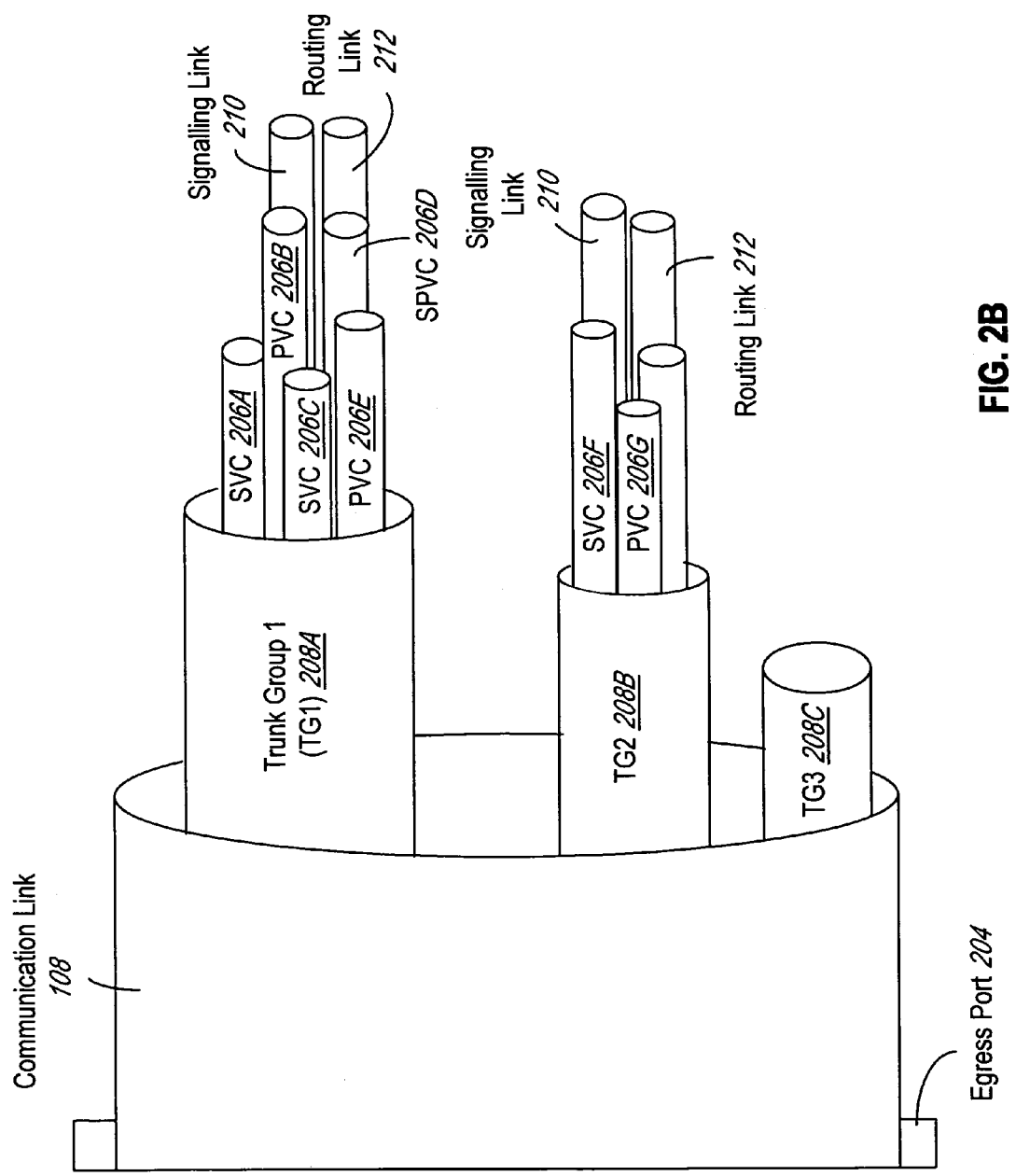
FIG. 2B is a diagram of a partitioning of bandwidth of a communication link of an egress port of the node of FIG. 2A.

Referring to FIG. 2B, relationships amongst an egress port 204 for a node 106 and the associated egress communication link 108 are shown. As described earlier, an egress port 204 provides the physical connection point for egress communication link 108 to node 106. Through communication link 108, the egress port 204 can carry a plurality of connections 206. Again, the connections 206 may provide any of a SVC, PVC, SPVC and others. Each connection 206 can be configured to provide a particular QoS, e.g. CBR, VBR, rtVBR, nrtVBR, ABR and UBR. A set of connections may be grouped into a trunk group 208. A trunk group may also have an associated a P-NNI signalling link 210 and a P-NNI routing link 212. For example, trunk group 208A comprises SVC 206A, PVC 206B, SVC 206C, SPVC 206D, PVC 206E, signalling link 210 and routing link 212. Sets of trunk groups may be established within ports to reach the same destination node.

In establishing a call, e.g. an SVC, through network 100, at a given node 106 the following procedure is used to negotiate a cross-connection through its switching core 204 for an egress path from the node for an ingress path to the node. It will be appreciated that for data path 110, the negotiations are conducted on a node-by-node basis in building a data path from CPE 102A to CPE 102B through network 100. The procedure involves processing on the ingress side of the node and the egress side of the node.

On the ingress side of the node 106, a call is not routed, per se, as the node has already been selected by the upstream node. However, support for connection endpoint for the requested connection with the ingress trunk group must still be verified against the service and path parameters of the trunk group in order to determine whether the selected route can support the connection. The parameters include the type of service supported by the trunk group and the assigned path cost, described later, for the trunk group. Next, a bandwidth partition relating to the requested connection type (e.g. SVC, SPVC, LSP, PLSP) that supports the requested service category and that has sufficient bandwidth for the requested connection must be selected from the available egress connections. Finally, an appropriate VPI/VCI or VPI must be selected for the egress connection if the call is being assigned.

Next, on the egress side of node 106, the appropriate outgoing route must be selected. There may be several egress trunk groups associated with the outgoing route for the node 106. Each trunk group will have the same destination node; however each trunk group may have differing service and connection characteristics. Again, the selected route must be able to support the call. For a route, values for data path parameters which are required to have the route reach a specific ATM address are maintained for the route. Examples of data path parameters include administrative factors relating to "costs" for using a trunk group, destination addresses, lists of trunk groups, and status of routes. For each route, a list of trunk groups which can carry the connection is maintained. The outgoing trunk group 208 must be selected from the list. Next, the bandwidth partition relating to the requested connection type (e.g. SVC, SPVC) that supports the requested service category and that has sufficient bandwidth for the requested connection must be selected from the available egress connections in the selected trunk group. Finally, an appropriate VPI/VCI or VPI must be selected for the egress connection if the call is being assigned.

Further detail is provided on the selection of a trunk group on the egress side of node 106. When selecting the appropriate route, the call defined by the network operator is examined by the node against the ATM addresses known to the node 106. These ATM addresses are stored in a routing table. The ATM address entry in the routing table having the most complete contiguous match with the called party number is the best match. If a match or a suitable substitute is not found in the routing table, the call is rejected. For each ATM address entry in the routing table, a trunk group list is provided. The trunk group list provides a list of possible physical connections that can forward calls to that ATM address.

In the embodiment, the routing table provides a primary route and an alternate route in a route list. The primary route is the first route selected when attempting to route a call. The alternate route is selected only if either the call cannot be routed on any trunk group within the primary route or after the primary route is selected and the call is forwarded out the primary route, the call is cranked back to the node. The alternate route may contain a longer path for the call which goes through more nodes to reach the destination node. In the node 106, each route may be associated with a series of trunk groups and each trunk group may be associated with more than one route.

Once the primary or alternate route has been selected, a trunk group from the selected route must be identified. When selecting a trunk group, it must be operational and the signalling link controlling it must be operational. The connection admission control (CAC) must also be able to admit the call to the trunk group. If a series of trunk groups meet the noted minimum characteristics, then the bandwidth load characteristics of each trunk group is examined to determine the trunk group which provides a desired bandwidth distribution for the call in view of the other calls carried by the node.

First, when assessing bandwidth load characteristics of the trunk groups, each trunk group is assessed for its administrative compatibility with the call. Administrative factors for a trunk group include: its routability; the "cost" associated with the trunk group; the operational status of its signalling link; whether it is different from the ingress trunk group; whether it has a partition which supports the service category of the call (CBR, rt-VBR, nrt-VBR, ABR, UBR) and the type (SVC, SPVC). The routability of the call relates to operational status of higher signalling links (e.g. P-NNI signalling links) and the operational status of its associated links for a trunk group. The cost associated with the trunk group is a cost figure, which is typically assigned by a network administrator, associated with data traffic using that trunk group. For example, a longer distance connection may have a higher cost than a shorter distance connection. As another example, a high-capacity trunk group may have a higher cost figure than a low-capacity trunk group. Normally, a high-capacity trunk group should have a lower cost value because it should be the trunk group which is selected first; however, the system has the flexibility to allow the cost value to be set to a higher value than what would normally be assigned, for any reason, thereby placing that trunk group further down in ranking of trunk groups. Cost factors are known parameters which can be assigned to trunk groups according to P-NNI standards. Cost factors may have configurable values, even arbitrary values, set by the network administrator. Further, it will be appreciated that costs and weights may be customized for different parameters and structures, which may be determined by the network administrator. Also, in the embodiment, complete routing of a call is not permitted in the same trunk group. Accordingly, a call from an ingress trunk group is not allowed to be routed out onto the same trunk group.

In the embodiment, an administrative factor score is assigned to each trunk group for its cost factor. The score of the administrative factors of each trunk group are tallied and the trunk group having the best score, i.e. lowest cost, is the "cheapest" trunk group in the route for the call. It will be appreciated that other tallying regimes may be used wherein other administrative factors for each trunk group are evaluated in some other fashion against each other. In other embodiments, the administrative factors may not be evaluated for each trunk group.

In addition to evaluating the administrative factor score for each trunk group, the embodiment evaluates the connection and service parameters of each trunk group against the requirements of the call. Accordingly, each trunk group is also evaluated for its available bandwidth and its associated service categories (e.g. CBR, rt-VBR, nrt-VBR, ABR and UBR) and its connection types (e.g. SVC, PVC, SPVC). Trunk groups with a partition meeting all minimum requirements for the call may be capable of processing the call. However, the embodiment further analyzes the properties and bandwidth loading levels of the capable trunk groups or trunk group partition in order to select a superior trunk group for the call.

In many cases, several trunk groups may each be capable of handling the connection and may each have the same, or sufficiently comparable, best cost value for its administrative factor scores. Accordingly, in order to select one trunk group from those several trunk groups, a bandwidth load balance value is calculated for each trunk group. The load balance value indicates what percentage of the total available bandwidth in an eligible trunk group partition of that trunk group would be consumed by the bandwidth of the current calls plus the proposed call. Briefly, for a given trunk group "i" (TGi), its load balance value is calculated as:

$$\text{Load balance}(TGi) = \frac{\text{Bandwidth used on } TGi}{\text{Max. Bandwidth configured for } TGi} \quad \text{(Equation 1)}$$

$$= \frac{\text{Bandwidth used for current calls} + \text{Bandwidth of proposed call}}{\text{Max. Bandwidth configured for } TGi}$$

It will be appreciated that as the number of current calls changes dynamically, the value of the "Bandwidth used by the current calls" in Equation 1 will change. Accordingly, the load balance value in Equation 1 is not static.

After each trunk group has had its load balance value calculated, the node will select the trunk group having the lowest load balance value. The trunk group with the lowest load balance value has, as a percentage, more capacity to handle the call. As the load balance value introduces a percentage into the evaluation of the capacities of the trunk group, with Equation 1 the absolute capacity values of each trunk group are not used. Accordingly, use of the defined load balance values provides a mechanism which ensures that a trunk group is not necessarily always selected merely because it has the larger capacity, regardless of its current loading state.

It will be appreciated that in other embodiments, it may be desirable to select a trunk group on the basis of the total absolute available bandwidth therein. In such other embodiments, the following load balance equation may be used:

$$\text{Load balance}(TGi) = \frac{\text{Bandwidth available for } TGi}{\text{Max. Bandwidth configured for } TGi} \quad \text{(Equation 2)}$$

Using Equation 2, the trunk group which has the most available bandwidth would be selected.

It will be appreciated in balancing the bandwidth load amongst trunk groups, other algorithms may be used. One alternative algorithm would select the trunk group having the largest bandwidth first, until the available bandwidth in that trunk group drops to the value of the available bandwidth for the next larger trunk group. At that point, the algorithm distributes the load between the two trunk groups in an even fashion. In an alternative embodiment, an algorithm would evenly distribute loads between two trunk groups until one trunk group is operating at capacity, and then the algorithm would distribute the remaining load to the other trunk group.

It is noted that both Equations 1 and 2 may be used when the proposed call has a defined, non-zero bandwidth allocation. Guaranteed bandwidth allocations are provided with calls having services in the following service categories: CBR, rtVBR, nrtVBR, ABR with a non-zero minimum cell rate (MCR) and UBR with a non-zero MCR.

However, as noted in the background, some service categories are provided on a "best effort" basis. Accordingly, calls having such service categories essentially have a bandwidth allocation of 0. Examples of these zero bandwidth service categories include ABR with zero MCR and UBR with zero MCR. Accordingly, if Equation 1 was used for calls with zero bandwidth service categories, the value of the "Bandwidth of the current call" would be 0 and Equation 1 would produce a result which did not account for the bandwidth used by all the calls having zero bandwidth service categories.

To ensure that calls having zero bandwidth (ZBW) service categories are accounted for in some manner when selecting a trunk group, the following equation is used for ZBW calls:

$$\text{Load balance}(TGi) = \frac{\text{Number of current calls with } ZBW + 1}{\text{Max. Bandwidth configured for } TGi} \quad \text{(Equation 3)}$$

Equation 3 provides a ratio of the total number of calls having a zero bandwidth service category in the trunk group (which is the number of current calls with ZBW in the trunk group +1, for the proposed call with ZBW) against the total available bandwidth for the trunk group. Again, the load balance value is calculated for each trunk group and, the trunk group having the lowest loading value is selected.

It will be appreciated that in other embodiments, for a zero bandwidth call, it may be desirable to evaluate the percentage of zero bandwidth calls handled by each trunk group. In such other embodiments, the following load balance equation may be used:

$$\text{Load balance}(TGi) = \frac{\text{Number of current calls with } ZBW \text{ in } TGi + 1}{\text{Total number of } ZBW \text{ calls in node} + 1} \quad \text{(Equation 4)}$$

In Equation 4, the denominator essentially tracks the number of all calls with the proposed call (which is represented by the "+1" factor) having a zero bandwidth service category rating which are currently being processed in all trunk groups in the node. If Equation 4 were used, the trunk group having the lowest load balance value would be selected. It will be appreciated that results from Equation 4 does not distinguish between capacities of trunk groups being compared (e.g. OC-3 vs. OC-12), but it does provide a measure of allocation of calls per trunk group.

It will be appreciated that for the Equations, for the bandwidth values, while they are described as being the maximum values, other values may be substituted therefor. Other values include predefined bandwidth values which may not be at the absolute maximum bandwidth capacity for the trunk groups.

It will be appreciated that in other embodiments, combinations and variations on the above noted algorithms and Equations may be used to distribute loads for both calls having a defined bandwidth and calls with ZBW.

It will further be appreciated that in another embodiment, a source node may be embodied as a logical source node, which is a group of nodes and a destination node may be embodied as a logical destination node. Trunk groups connecting the two logical nodes may comprise links where one source node in the logical source node is connected to one destination node in the logical destination node. Logical source and destination nodes are provided in P-NNI hierarchies. Accordingly, an embodiment may be used to select a trunk group between two logical nodes utilizing bandwidth load balance values, such as those described above.

After node 106 selects a trunk group, node 106 may proceed in a known conventional manner to establish or commission a signalled cross-connection between an incoming communication link 108 and an outgoing communication link 108.

Figure 3:
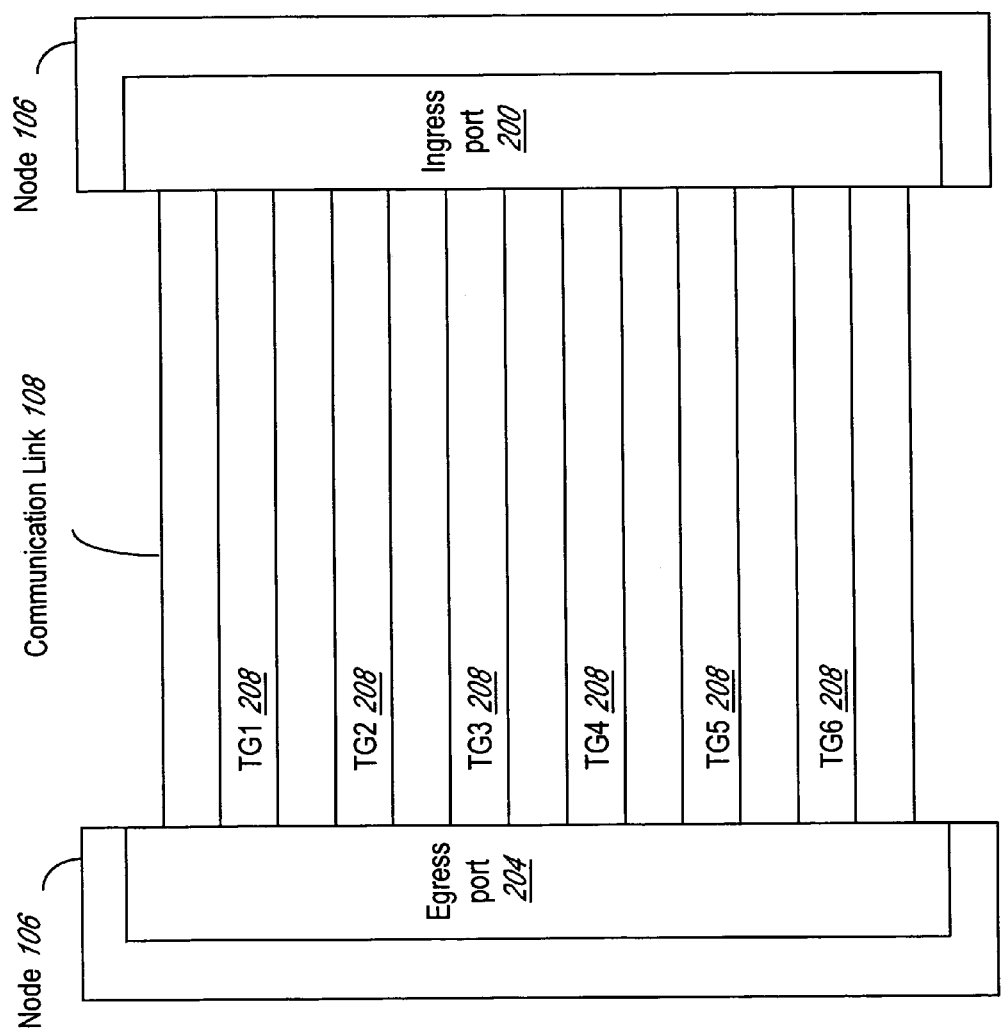
FIG. 3 is a block diagram of the node and the communication link of FIG. 2A connected to another node.

Following is an example of the use of Equations 1 and 3 in an embodiment. Referring to FIG. 3, two nodes (node 106A and node 106B) are shown with communication link 108 connecting each node to each other. In communication link 108, there are six trunk groups 206, identified as TG1, TG2 . . . TG6. The following Table A identifies the supported connection types, the supported service categories, the predetermined cost scores for administrative factors and bandwidth capacities for each trunk group.

TABLE A

| Trunk Group 208 | Supported Connection Types | Supported Service Categories | Admin. Factor Score | Maximum Bandwidth (Mbps) |
|---|---|---|---|---|
| TG1 | SVC, SPVC | CBR, rtVBR | 10 | 5 |
| TG2 | SVC, SPVC | CBR, rtVBR, ABR | 20 | 10 |
| TG3 | SVC, SPVC | CBR, rtVBR | 40 | 10 |
| TG4 | SVC, SPVC | CBR, ABR | 40 | 5 |
| TG5 | SVC, SPVC | ABR, UBR | 60 | 5 |
| TG6 | SVC, SPVC | ABR, UBR | 60 | 10 |

It is assumed that all calls (SVC and SPVC) are received on node 106A and destined to node 106B.

Initially, it is presumed that all calls have a CBR service category and that all trunk groups have sufficient bandwidth available to process the calls. Accordingly, in assessing the trunk groups, TG5 and TG6, which do not support CBR traffic, are not considered. Of the remaining trunk groups, TG1 . . . TG4, node 106A forwards calls through TG1 because it has the lowest administrative factor score ("10"). The value of the available bandwidth for TG1 is updated to reflect the consumed bandwidth of the CBR call.

As calls are added, each trunk group in the selected route is re-evaluated to determine whether it meets the minimum characteristics for the call. Again, for the example, it is presumed that CBR calls are received. Accordingly, only trunk groups TG1 . . . TG4 are considered. The bandwidth available for trunk groups TG1 . . . TG4 is checked and it is presumed each trunk group has sufficient bandwidth. As TG1 still has the lowest administrative factor score factor ("10") of the considered trunk groups, CBR calls are provided to it. The value of the available bandwidth for TG1 is updated to reflect the consumed bandwidth of the CBR call.

As calls are added to TG1, TG1 becomes exhausted and cannot admit more calls. After such time, for the next call when the available bandwidth is checked, it will be recognized that the TG1 does not have sufficient bandwidth for the call. Accordingly, TG1 it is not included in the set of available of trunk groups for the call.

Thereafter, node 106A receives more CBR calls. Again, each trunk group in the selected route is re-evaluated to determine whether it meets the minimum characteristics for the call. Again, for the example, trunk groups TG2 . . . TG4 have available bandwidth for the call. After the administrative factor scores of the trunk groups are evaluated, new calls are forwarded to TG2, as it has the lowest administrative factor score ("20").

Again, as calls are added to TG2, it is presumed that TG2 becomes exhausted and cannot admit more calls. At such time, TG2 does not meet the minimum requirements for new calls and TG2 is not included in the set of available trunk groups for new calls. It is presumed that for TG2, no calls are dropped.

Thereafter it is presumed that node 106A processes a CBR call. As only TG3 and TG4 are both capable of handling CBR traffic and have available bandwidth, their administrative factor scores are compared to determine the better trunk group. As their scores are equal, node 106A utilizes Equation 1 to determine which of TG3 and TG4 has the lower bandwidth load balance value. Note that as TG3 has a higher maximum bandwidth capacity than TG4, 10 Mbps vs. 5 Mbps, the load balance value of each trunk group will reflect, as a ratio, which trunk group is more fully loaded. The trunk group having the lower load balance value is selected by node 106A to carry the call. For subsequent CBR calls, node 106A recalculates the load balance values for TG3 and TG4 and again selects the trunk group having the lower load balance value. It can be seen that as subsequent CBR calls are provided to TG3 and TG4, the calls will be provided to the trunk group which is, as a percentage, less full than the other trunk group. Accordingly, load balance providing one type of fair allocation of bandwidth is achieved between the trunk groups.

Thereafter it is presumed that node 106A processes an ABR (with no MCR) call. The trunk groups which have ABR connections are TG2, TG4, TG5 and TG6. Assuming that TG4, TG5 and TG6 have sufficient bandwidth for the call, node 106A selects the trunk groups having the lowest administrative factor score which can process the call. Accordingly TG4 is selected. For the next ABR call, it is assumed that only TG5 and TG6 have sufficient bandwidth for the call. Accordingly, node 106A examines the administrative factor scores for each TG5 and TG6. As the factor scores for TG5 and TG6 are the same, node 106A utilizes Equation 3 to determine which trunk group should be selected. The trunk group having the lower load balance value determined from Equation 3 is selected. On the arrival of subsequent ABR calls, node 106A re-examines the trunk groups to see whether they have the bandwidth to handle the call and recalculates the load balance values for TG5 and TG6 using Equation 3. Again, the trunk group having the lower load balance value will be provided with the call.

It will be appreciated that in other embodiments other load balance value equations may be used for both calls having minimum bandwidth guarantees and calls without minimum bandwidth guarantees.

It will be further appreciated that in other embodiments, a load balance value equation may be used on a set of connections and thereafter the results may be used to define a set of connections from which a "winning" connection may be selected. The set of connections may be all connections capable of carrying the call from the node. That set of connections may then be further filtered by then applying administrative score factors to each member in that set to identify a "winning" call.

It will be appreciated that the embodiment may be implemented in software modules operating on a node 106. The software modules will have the ability to determine the connection type and service type for a call, using techniques known in the art. Also, a data structure containing relevant administrative factor scores for the connections must be maintained and be accessible by the software modules. The load balance equations would be processed by the software modules to select the appropriate connection. Alternatively, the calculations and processing may be done in software operating centrally at a control node for the network.

While the above description presents a load balance system for use in a node in an ATM network, it will be appreciated that in other embodiments, a load balance system using comparable algorithms and equations, and combinations thereof, as described above may be used in other networks where a selection is required between two communication paths. Accordingly, an embodiment may be implemented in an MPLS network where an MPLS node has the ability to select a tunnel between two tunnels connected to the same next node. Further still, an embodiment may be implemented in a connection-less network, such as an IP network, where an IP node must select forwarding a packet between two paths going to the same destination.

It is noted that those skilled in the art will appreciate that various modifications of detail may be made to the present embodiment, all of which would come within the scope of the invention.

We claim:

1. A method of selecting an egress connection from a plurality of egress connections at a node for a call being established in a network along a path being associated with the node, each connection of said plurality of egress connections having sufficient bandwidth to carry said call and terminating at a same destination point in said path, said method comprising utilizing at least a bandwidth load balance value for said each connection of said plurality of egress connections to select said egress connection from said plurality of egress connections, wherein said each connection comprises a trunk group; and, wherein said call has no minimum bandwidth guarantee; and for said each connection, said bandwidth load balance value comprises a ratio of a first value representing a number of calls associated with said each connection, each call of said number of calls having no minimum bandwidth guarantee; and a second value selected from one of a bandwidth configured for said each connection and a number of calls having no minimum bandwidth guarantee.

2. The method of selecting an egress connection from a plurality of egress connections at a node as claimed in claim 1, wherein for said each connection, said bandwidth load balance value comprises a ratio of a numerator selected from one of: bandwidth used on said each connection and bandwidth available on said each connection; and a denominator selected from one of: bandwidth configured for said each connection and bandwidth configured for said plurality of egress connections.

3. The method of selecting an egress connection from a plurality of egress connections at a node as claimed in claim 2, wherein a ranking is generated for at least said each connection against at least other connections utilizing an administrative factor score for said each connection; and said ranking and said bandwidth load balance value are utilized to select said egress connection.

4. The method of selecting an egress connection from a plurality of egress connections at a node as claimed in claim 3, wherein said administrative factor score for said each connection comprises a cost value for said each connection.

5. The method of selecting an egress connection from a plurality of egress connections at a node as claimed in claim 4, wherein said call follows a transmission protocol selected from ATM, MPLS and IP.

6. The method of selecting an egress connection from a plurality of egress connections at a node as claimed in claim 5, wherein said call has a service requirement selected from one of: constant bit rate (CBR), real-time variable bit rate (rt-VBR), non-real-time variable bit rate (nrt-VBR), available bit rate (ABR) and undefined bit rate (UBR) services.

7. The method of selecting an egress connection from a plurality of egress connections at a node as claimed in claim 6, wherein said call has a guaranteed bandwidth associated therewith.

8. The method of selecting an egress connection from a plurality of egress connections at a node as claimed in claim 1, wherein said call follows a transmission protocol selected from ATM, MPLS and IP.

9. The method of selecting an egress connection from a plurality of egress connections at a node as claimed in claim 1, wherein said call has a service requirement selected from one of: constant bit rate (CBR), real-time variable bit rate (rt-VBR), non-real-time variable bit rate (nrt-VBR), available bit rate (ABR) and undefined bit rate (UBR) services.

10. The method of selecting an egress connection from a plurality of egress connections at a node as claimed in claim 9, wherein said balanced load value is calculated prior to applying said administrative score factor.

11. A system for selecting an egress connection from a plurality of egress connections at a node in a network for a call being established in said network along a path being associated with said node, each connection of said plurality of egress connections having sufficient bandwidth to carry said call, said system comprising:
  a connection selection module adapted to select one connection from said plurality of egress connections to carry said call by detennining a bandwidth load balance value for each connection in said plurality of connections and selecting said one connection by comparing bandwidth load balance values of connections in said plurality of connections, wherein said each connection comprises a trunk group;
  wherein if said call has a guaranteed bandwidth, said connection selection module determines said bandwidth load balance value by utilizing a first ratio comprising a numerator selected from one of: bandwidth used on said each connection and bandwidth available on said each connection; and a denominator selected from one of: bandwidth configured for said each connection and bandwidth configured for said plurality of egress connections; and,
  wherein if said call does not have a guaranteed bandwidth, said connection selection module determines said bandwidth load balance value by utilizing a second ratio comprising a first value representing a number of calls associated with said each connection, each call of said number of calls having no minimum bandwidth guarantee; and a second value selected from one of a bandwidth configured for said each connection and a number of calls having no minimum bandwidth guarantee.

12. The system for selecting an egress connection from a plurality of egress connections at a node as claimed in claim 11, wherein said connection selection module generates a ranking of said each connection against other connections of said plurality of connections utilizing an administrative factor score for said each connection; and utilizing said ranking and said bandwidth load balance value to select said egress connection.

13. The system for selecting an egress connection from a plurality of egress connections at a node, as claimed in claim 12 wherein said call follows a transmission protocol selected from ATM, MPLS and IP.

14. A method of selecting a trunk group for routing a call in a connection-based network, said method comprising the steps of:
  (a) identifying a set of trunk groups that are capable of meeting requirements of said call, each trunk group of said set having a same destination node;
  (b) accessing a previously determined administrative factor for each trunk group of said set;
  (c) if only one trunk group of said set has the lowest administrative factor, selecting a trunk group with the lowest administrative factor for routing said call; and
  (d) if a plurality of trunk groups of said set has the lowest administrative factor, calculating a bandwidth parameter for each trunk group of said plurality, and selecting a particular trunk group from said plurality for routing said call utilizing said bandwidth parameter.

15. The method of claim 14, wherein
a requirement of said call comprises a guaranteed bandwidth; and
said step d) comprises:
  calculating, for each trunk group providing said guaranteed bandwidth, said bandwidth parameter as a ratio of available bandwidth of said each trunk group to maximum bandwidth configured for said each trunk group; and
  selecting, as the particular trunk group, a trunk group with the lowest bandwidth parameter.

16. The method of claim 15, wherein
said call has no guaranteed bandwidth; and
said step d) comprises:
  calculating, for each trunk group supporting said call, said bandwidth parameter as a ratio of a number of unspecified bandwidth services calls carried by said each trunk group to a maximum bandwidth configured for said each trunk group; and selecting, as said particular trunk group, a trunk group with the lowest bandwidth parameter.

* * * * *

UNITED STATES PATENT AND TRADEMARK OFFICE
CERTIFICATE OF CORRECTION

PATENT NO. : 7,310,341 B2
APPLICATION NO. : 10/302922
DATED : December 18, 2007
INVENTOR(S) : Prager et al.

It is certified that error appears in the above-identified patent and that said Letters Patent is hereby corrected as shown below:

Claim 11, column 13, line 48: Replace the word "detennining" with the word --determining--.

Signed and Sealed this

Twenty-ninth Day of April, 2008

JON W. DUDAS
*Director of the United States Patent and Trademark Office*